US007203945B2

(12) United States Patent
Kravtchenko et al.

(10) Patent No.: US 7,203,945 B2
(45) Date of Patent: Apr. 10, 2007

(54) IMPORT/EXPORT UTILITY AND A METHOD OF PROCESSING DATA USING THE SAME

(75) Inventors: Alexandre Kravtchenko, Sunnyville, CA (US); Leonid Khodulev, Cupertino, CA (US); Andrei Skaldin, Saratoga, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 676 days.

(21) Appl. No.: 09/930,160

(22) Filed: Aug. 16, 2001

(65) Prior Publication Data

US 2003/0037175 A1 Feb. 20, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................ 719/313; 707/10

(58) Field of Classification Search ................ 709/200, 709/201, 227, 310–320, 328–330; 707/200–206, 707/1–10, 100–104; 719/310–320, 328–330
See application file for complete search history.

(56) References Cited

U.S. PATENT DOCUMENTS

| | | | | |
|---|---|---|---|---|
| 5,899,998 | A * | 5/1999 | McGauley et al. | 707/104.1 |
| 6,163,781 | A * | 12/2000 | Wess, Jr. | 707/103 X |
| 6,363,388 | B1 * | 3/2002 | Sprenger et al. | 707/10 |
| 6,754,670 | B1 * | 6/2004 | Lindsay et al. | 707/100 |
| 2002/0133510 | A1 * | 9/2002 | Lau | 707/203 |

* cited by examiner

*Primary Examiner*—Meng-Al T. An
*Assistant Examiner*—Diem Cao
(74) *Attorney, Agent, or Firm*—Kent A. Lembke; William J. Kubida; Hogan & Hartson LLP

(57) ABSTRACT

A method of processing data in a system including an utility, includes the steps of starting a session, selecting a file on a local drive or by URL, wherein the file includes a name of a business object, uploading the file including the name of a business object to a server, storing data of the file in a database of the utility, performing asynchronous data processing, and downloading and saving a report after the data processing is completed.

27 Claims, 3 Drawing Sheets

| | | |
|---|---|---|
| IE-UID | IE-STATUS | IE-IODATA |
| IE-EXPDATA | IE-IOERRORS | IE-LOG |

IMPORT/EXPORT UTILITY AND A METHOD OF PROCESSING DATA USING THE SAME

BACKGROUND OF THE INVENTION

1. Field of the Invention

The present invention relates to an import/export utility, and more particularly, to an import/export utility that imports and exports business objects.

2. Discussion of the Related Art

Conventionally, a database loader is used to load information to an E-commerce system. However, the database loader loads only tables.

In E-commerce system, there are business objects (BO) which are resources. The business objects include information regarding payments, units, and credit cards, for example. Therefore, there is a need for a utility that is capable of receiving/sending information from/to the business object or restoring the business object on the other system.

SUMMARY OF THE INVENTION

Accordingly, the present invention is directed to an Import/Export Utility that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of processing data in a system including an utility, includes the steps of starting a session, selecting a file on a local drive or by URL, wherein the file includes a name of a business object, uploading the file including the name of a business object to a server, storing data of the file in a database of the utility, performing asynchronous data processing, and downloading and saving a report after the data processing is completed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

Figures 1, 2:
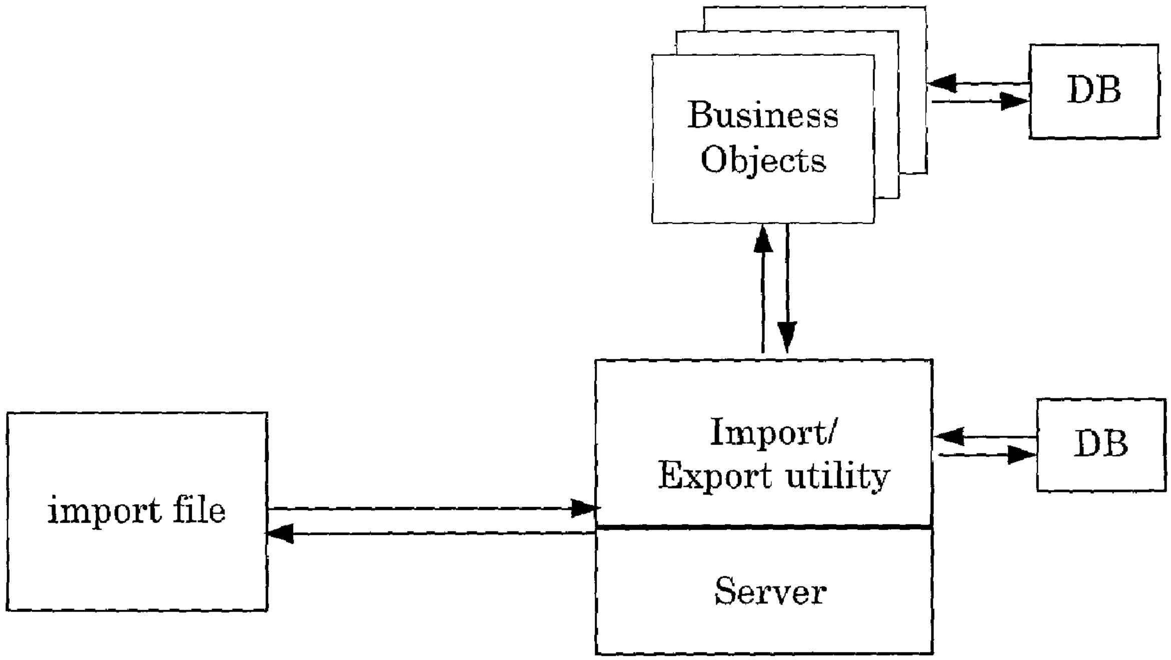
FIG. 1 is a block diagram of data processing according to the present invention.
FIG. 2 is a block diagram illustrating ImpExp database.

The present invention will now be described with reference to FIG. 1.

The present invention includes a system having a client, a server, and an import/export utility. The user sends requests to the server and receives responses from the server. The client uses an internet browser or a system console to work with the import/export utility through a graphical user interface (GUI) or a command line interface, respectively. The import/export utility is designed to process the import file on the remote server or the client. The import/export utility imports/exports data from/to external files, by invoking business objects. The import/export utility receives information from the import file or the business objects, and loads the information into business objects or restores the information on another system. The business objects may be written in Java, for example, and may contain resources in E-commerce systems, such as payments, units, credit card, and user information, for example.

For a successful interaction with the import/export utility, the business object should be described in a data objects repository (DOR). The business object is implemented with three static methods—doImportExport, findByAttributes, and close. The doImportExport is a method to perform a particular import/export command. A name of operation and two lists of parameters are passed to the doImportExport. The business object is responsible for validation of the operation. The second parameter list in the doImportExport may be null since it is important only for updating the operations. The last parameter in each of the lists is an interface to support export operation. The doImportExport returns null if the operation was successful and an error string if the operation was not successful. If the error string is returned, then the returned error string is put directly into a discard file that will be returned to the user. The findByAttributes supports object references in import files. The findByAttributes receives a list of attributes of the validated object and returns a unique object identifier, such as GUID (Globally Unique Identifier), for example, or null if error occurs. The close method notifies the end of the process.

Figure 3:
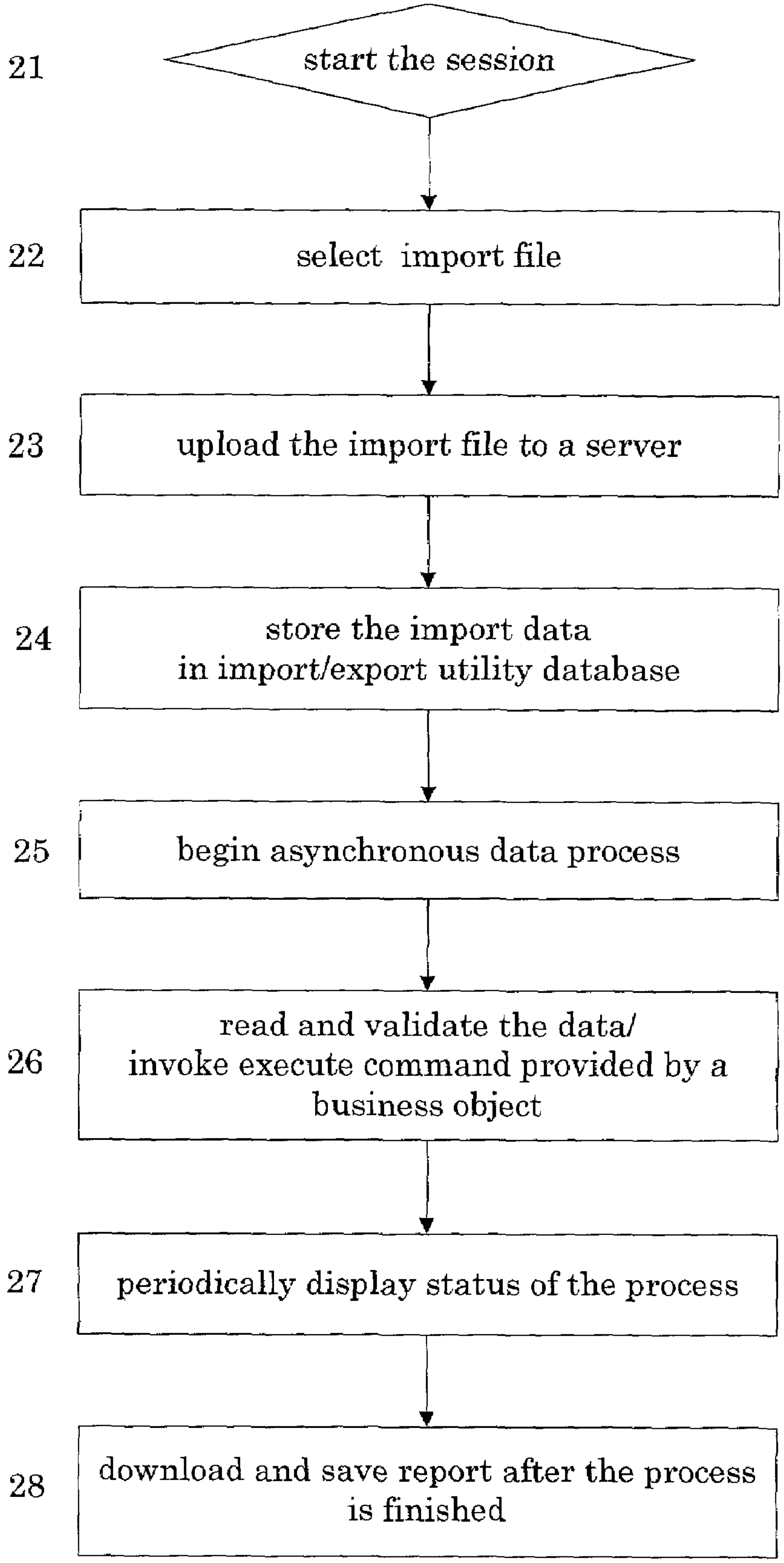
FIG. 3 is a flow chart describing the data processing according to the present invention.

FIG. 3 shows the steps of an import/export session of the system according to the present Invention.

In step 21, the session is started. In this step, a unique session ID is generated and configuration settings are checked. The user can pass several parameters in this step—a first parameter being 'user Name' which is used in session ID generation, a second parameter being 'userPass' which is not used in this step, and a third parameter being 'fileNum' which determines how many 'FILE' controls will be placed in a 'SelectFile' screen.

In step 22, an import file is selected by browsing local drives or typing a URL. The 'FILE' control is used in a browser interface, and a command line parameter is used for a list of tiles to be uploaded in a command line interface.

In step 23, the import file is uploaded to a server via the browser or the command line interface.

In step 24, the data of the import file is stored in a import/export utility database, ImpExp database. The import/export database includes six tables, as shown in FIG. 2,—"IE_UID" for storing user names and corresponding session IDs; "IE_STATUS" for storing current session status which is periodically updated; "IE_IODATA" for storing initial session data obtained from the import file; “IE_EXPDATA” for storing results of the export operations; “IE_IOERRORS” for storing error messages; and “IE_LOG” for storing all sessions log. Then, asynchronous data processing begins in step 25.

In step 26, reading and validating of the data is performed and errors are logged. Further, the doImportExport method provided by the business object is invoked.

In step 27, status of the data processing is periodically displayed.

In step 28, downloading and saving report is performed after the data processing is finished.

The user on the client side can control the process using a SelectFile screen, Start screen, Status screen, GetReport screen, and Abort screen. In the SelectFile screen, the user receives unique session ID and the user can stop the session and resume the session later. In the SelectFile screen, the user can browse local disks or input URL or the network path to select the file to be uploaded. When the import file was successfully uploaded and loaded into the ImpExp database, the Start screen appears. In the Start screen, the user can start the process or postpone the process. The Status screen appears after the process is initiated. The Status screen displays a current business object that is being processed, operation that is being performed, a sequence number of the current attribute section in current control section, and a number of the current data line in the current attribute section. The user can terminate the session and resume the session later. However, the termination will not be performed until processing of the current data line is completed.

After successful completion of the process, the user receives the GetReport screen. In the GetReport screen, the user can initiate downloading of the discard file and log files. Further, the user can select session data to be removed from the ImpExp database and is able to choose whether to download the whole discard file or only lines where errors exist. Also, the user receives an Abort screen when the user chooses to stop the process on the Status screen, and an Error screen when fatal error occurs that makes it impossible to continue the whole session.

The import file includes 3 types of data—a name of business object to be invoked, operation to be performed, such as insert new user and delete upgrade, for example, and properties of the business object. A simplified CSV (comma-separated values) format may be used for the import file. The import file is a text file of several lines. In the import file, empty lines and comment lines can be inserted anywhere, and all other lines are separated into three groups—control section or command lines, attribute names or header lines, and data or body lines. The command line, containing operation and object names, starts with “<” and defines a command for all subsequent body lines. The header line, containing a list of the columns in the body lines, starts with “^” and defines the format for the body lines. The body line, which is a list of values (usually business object attributes: text, numeric, data, for example), contains one value for each of the columns from the last header line. Operand in lines are comma-separated and space symbols between operands are non-significant. For some operations, such as update, for example, it might be necessary to pass two values for the each of the columns, for example, old and new values of the column, to the business object. In this case, those values are separated with a special character “|” and space symbols are non-significant. The following is an example of the import file structure:

```
### comment; command line follows:
< command1, className1
# new group of body lines starts after a header line:
^ columnName1, columnName2, columnName3, . . .
value11, value12, value13, . . .
value21, value22New | value22Old, value23, . . .
# next group starts here:
^ columnName4, columnName5, . . .
value31, value32, . . .
value 41, value42, . . .
. . .
### next command starts
< command2, className2
```

The body lines of the import file can contain references to the other business objects. The references are used to obtain the properties, GUID for example, of the referenced object while the main object importing is being processed. The following is an example of a reference:

[refObjName objAttrName 1=“objAttrVal1” objAttrName2=“objattrVal2” . . . ]

The references can be nested. The following is an example of a nested reference:

[User Name=“Alex” Group=[UserGroup Name=“software”]]

However, a reference to a business object being referred to has to be created before a business object with a body line containing the reference is created.

Figure 4:
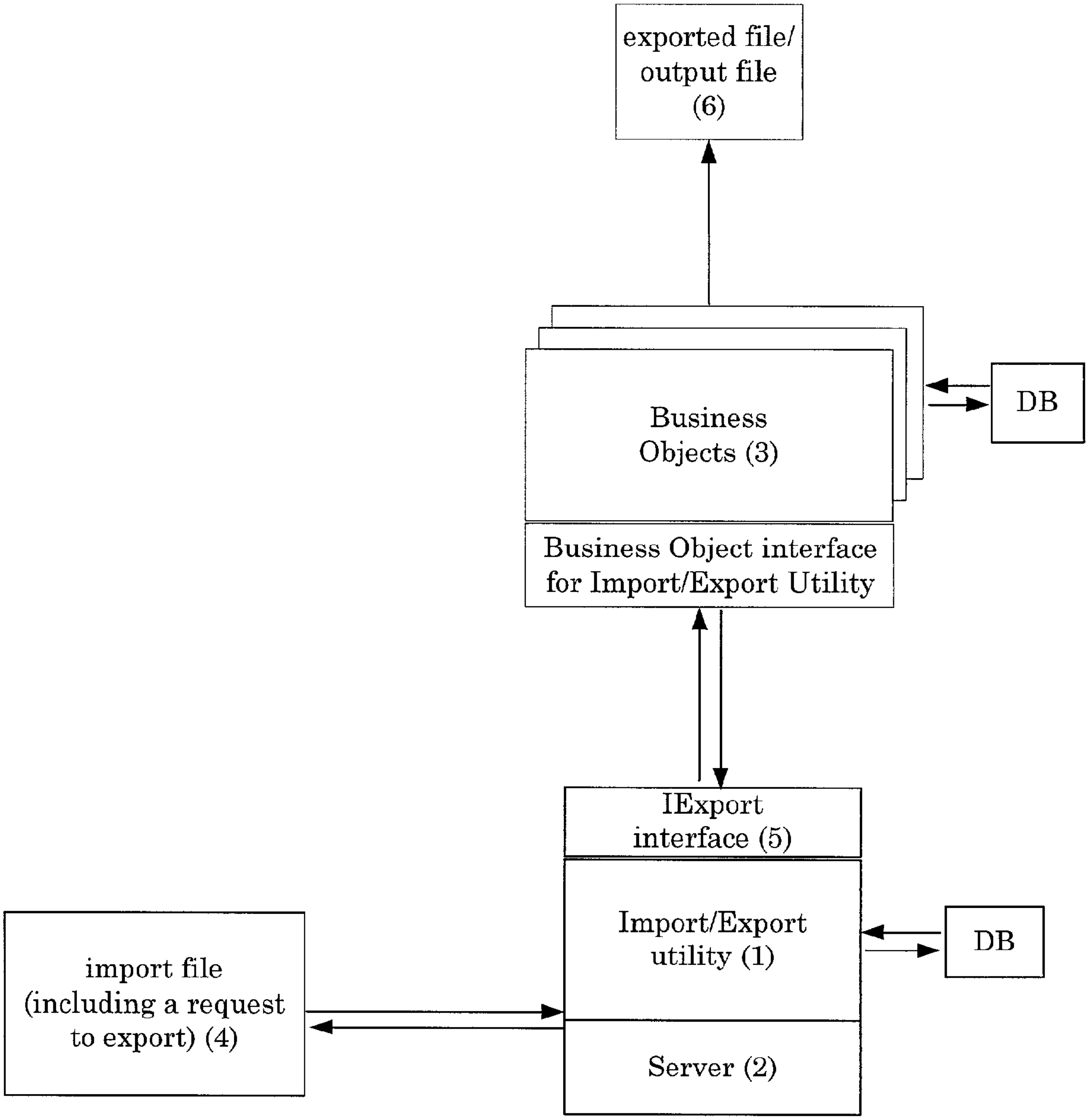
FIG. 4 is a block diagram of data processing for an export operation according to the present invention.

The default values for some of the object attributes may be defined in the control section. The definition strings are separated from object and operation fields and from each other by commas—for example, < operation, objName, orgName=AOL, orgType=SELLER FIG. 4 shows data processing in the system performing an export operation according to the present invention.

For an export operation, IExport interface (5) is passed to the business object (3) to support the export operation, in addition to the steps of the import/export session explained above. The IExport interface includes startExport, onReceiveExport, and stopExport methods and those methods are called from the business object.

The startExport signals starting of the export data process and forms the proper control section in an output file (6) of the operation. The startExport contains two parameters—operation which is a name of the operation to be inserted into a control section of output file, and className which is a business object class name to be inserted into the control section of the output file. The onReceiveExport calls back for the export data process and throws one attribute set at a time. The onReceiveExport contains two parameters—errMsg which is an error message for the operation, and attributes which is a single attribute set returned by the business object for the operation. If the errMsg is not null, than the operation is cancelled. The stopExport method signals stopping of the export data process. Then, results of the successfully ended operation is put in the ImpExp database.

The business object can export all of its data or part of its data. In the case where the business object exports all of its data, the following syntax of the import file can be used, for example:

```
< read, BusObj
^ *
```

In the case where the business object exports part of its data, the following syntax of the import file can be used, for example:

```
< read, BusObj
^attrName1, attrName2
val1, val2
```

In this example, only the objects for which attrName1=val1 and attrName2=val2 will be exported.

The following is another example for the export operation with following syntax in the import file:

```
# command line
< Insert, User
# header line—enumerated attributes
^ name, age, group
# instances
Ivan, 23, [Group name="Software"]
Alex, 30, [Group name="Software"]
```

In this example, two instances of business object "User" with listed attributes are exported. The import/export utility passes the import file and receives a business object name (resource name).

Further, Authentication control and Session Management Utility (SMU) can be implemented in the import/export utility. With the Session Management Utility, the user can select one or several sessions to manage and resume the processing of the selected sessions, to stop processing active sessions, to remove all selected sessions, to except active sessions from the ImpExp internal database, and to check properties of the selected sessions. The Session Management Utility can be started at the Select File screen.

In the present invention, the import/export utility is like copying data from the business object. The import/export utility knows nothing about which E-commerce system it is working with. The real work is done inside of the business object itself. The import/export utility is a deliverer of information. The import/export utility delivers the data from the external files to the business object and vice versa, and the business object performs the validation and performs the tasks, such as adding, deleting, or updating of the data. The data can be changed without changing the business object. Further, the import/export utility of the present invention provides a process monitoring function, an error handling function, and a reporting function.

It will be apparent to those skilled in the art that various modifications and variations can be made in the import/export utility of the present invention without departing from the spirit or scope of the invention. Thus, it is intended that the present invention covers the modifications and variations of this invention provided that they come within the scope of any claims and their equivalents.

The invention claimed is:

1. A method of processing data in a system including an utility, comprising the steps of:
 - starting a session;
 - selecting a file on a local drive or by URL, wherein the file includes a name of a business object;
 - uploading the file including the name of the business object to a server;
 - storing data of the file in a database of the utility;
 - delivering the data to the business object corresponding to the name uploaded to the server;
 - with the business object, performing a task on the delivered data, the task performing including invoking a code included in the business object, wherein the task comprises adding, deleting, or updating of the data delivered to the business object and wherein the code includes an interface to support an export operation, and the business object includes a second code including a command which provides an instance of the business object with an attribute; and
 - downloading and saving a report after the data processing is completed.

2. The method of processing data according to claim 1, wherein the code includes doImport/Export.

3. The method of processing data according to claim 2, wherein the doImport/Export is a command to perform an operation.

4. The method of processing data according to claim 1, wherein the interface includes a code for throwing an attribute set returned by the business object.

5. The method of processing data according to claim 1, wherein the utility is designed to process the file on the remote server.

6. The method of processing data according to claim 1, wherein the session is for import and export operations.

7. The method of processing data according to claim 1, wherein the starting of a session includes generating a unique session ID.

8. The method of processing data according to claim 1, wherein the database of the utility includes a plurality of tables.

9. The method of processing data according to claim 8, wherein the plurality of tables include a user name and session ID storing table, a session status storing table, an initial session data storing table, a result storing table, an error message storing table, and a session log storing table.

10. The method of processing data according to claim 1, wherein the business object includes a findByAttributes.

11. The method of processing data according to claim 10, wherein the findByAttributes supports object references in the file.

12. The method of processing data according to claim 1, wherein the business object includes a code that receives a list of validated object attributes and returns a unique object identifier.

13. The method of processing data according to claim 1, wherein the business object includes a code for notifying an end of the data processing.

14. The method of processing data according to claim 1, wherein the file is a text file including command lines, header lines, and data.

15. The method of processing data according to claim 1, wherein the session is an export operation.

16. The method of processing data according to claim 15, wherein the business object exports all of its data or part of the data.

17. The method of processing data according to claim 15, wherein the business object calls an interface including a plurality of codes.

18. The method of processing data according to claim 17, wherein the plurality of codes include a first code including a name of operation and a business object class name to be inserted into an output file.

19. The method of processing data according to claim 17, wherein the plurality of codes include onReceiveExport.

20. The method of processing data according to claim 19, the on ReceiveExport is a code for throwing an attribute set returned by the business object.

21. The method of processing data according to claim 1, wherein the utility is a deliverer of information.

22. The method of processing data according to claim 1, wherein the data is changed without changing the business object.

23. The method of processing data according to claim 1, wherein the utility includes a monitoring function, an error handling function, and reporting function.

24. The method according to claim 1, wherein the utility receives information from another system and loads information to the business object.

25. The method according to claim 1, wherein the utility receives information from the business object and stores information on another system.

26. The method processing data according to claim 1, further comprising after the delivering of the data, performing validation with the business object.

27. A method of loading information to a network application, comprising:

providing a utility on a server for exporting and importing data to the network application;

associating a database with the utility;

with the utility, receiving a selection of an import file, the import file comprising data in a text file and including a name of a business object;

with the utility, uploading the data and the business object name from the selected import file, wherein the uploaded data is stored in the utility database;

operating the utility to invoke the business object associated with the business object name including delivering at least a portion of the uploaded data to the invoked business object, whereby the business object performs an operation on the delivered data, and wherein the business object includes an interface to support an export operation and a command which provides an instance of the business object with attribute;

updating the data in the utility database based on the performance of the operation by the invoked business object; and downloading and saving a report after updating the data in the utility database is completed.

* * * * *